United States Patent [19]
Nemoto et al.

[11] Patent Number: 5,739,610
[45] Date of Patent: Apr. 14, 1998

[54] ELECTRO-MAGNETIC DEVICE

[75] Inventors: Masahiko Nemoto, Machida; Toshihiko Uematsu; Kyouichi Kakishima, both of Yamanashi-ken, all of Japan

[73] Assignee: Otis Elevator Company, Farmington, Conn.

[21] Appl. No.: 631,730

[22] Filed: Apr. 10, 1996

[30]     Foreign Application Priority Data

Apr. 11, 1995 [JP] Japan .................................. 7-085064
Apr. 11, 1995 [JP] Japan .................................. 7-085065

[51] Int. Cl.⁶ ...................... H02K 7/10; H02K 49/00; B60L 7/00
[52] U.S. Cl. .................. 310/93; 310/77; 310/51; 188/158; 188/161
[58] Field of Search .................... 310/77, 93, 76, 310/92, 51, 36; 188/161, 158

[56]              References Cited

U.S. PATENT DOCUMENTS

| | | | |
|---|---|---|---|
| 3,502,918 | 3/1970 | Done et al. | 310/77 |
| 3,734,245 | 5/1973 | Hubbard | 188/163 |
| 3,735,174 | 5/1973 | Bosch et al. | 310/266 |
| 3,760,909 | 9/1973 | Grove | 188/138 |
| 4,059,779 | 11/1977 | Wistinghausen | 310/77 |
| 4,466,511 | 8/1984 | Garnett | 188/134 |
| 4,628,752 | 12/1986 | Paxton et al. | 74/411.5 |
| 5,030,865 | 7/1991 | Rockey et al. | 310/78 |
| 5,185,543 | 2/1993 | Tebbe | 310/51 |
| 5,189,324 | 2/1993 | Beck et al. | 310/51 |
| 5,315,200 | 5/1994 | Lemieux | 310/258 |
| 5,530,304 | 6/1996 | Mirumachi et al. | 310/51 |

OTHER PUBLICATIONS

Roters, H.C., *Electromagnetic Devices*, pp. 200, 201 Published by the author, 1941.

*Primary Examiner*—Steven L. Stephan
*Assistant Examiner*—Michael J. Wallace, Jr.

[57]           ABSTRACT

A magnet section is constructed by installing a coil (2) on a yoke (1), and an armature (3) is placed facing the attracting surface of this magnet section. Indentations and projections are formed to confer the characteristics of both an opposing type electromagnet and a plunger type electromagnet on the magnetic path portion that faces yoke (1) and armature (3). By doing this, the attractive force characteristics will be uniform, and the operating speed and the holding position of the armature can be set as desired by adjusting the magnetization. Thus, the force of impact can be lessened by deceleration control of the armature, and the impact noise can be reduced. In a further aspect, a thin, single sheet annular, noise-damping waveform spring (6) is attached to the outer edge of the attracting surface of the magnet's yoke (1) or armature (3). This waveform spring (6) provides the armature (3) or yoke (1) with projecting sections and it is held so that the inner circumferential surface will be in contact with it. A braking spring (5), which provides braking force to the armature (3), is installed on the magnet portion. Support rods are attached to the yoke (1) and armature (3), and the middle attached section is joined by arms (41) and (42), held to turn freely with a support shaft, and pins. Linings (44) and (45) are attached in the forward end sections of arms (41) and (42) to sandwich the rails of the object being stopped. The force of impact during attraction is absorbed by the cushioning action of waveform spring (6), and the impact noise is greatly reduced.

2 Claims, 5 Drawing Sheets

ELECTRO-MAGNETIC DEVICE

BACKGROUND OF THE INVENTION

1. Technical Field

This invention is concerned with an electromagnetic device that is used for electromagnetic brakes and electromagnetic clutches, etc. The present invention also pertains to an electromagnetic brake activated by an electromagnet.

2. Description of the Prior Art

Electromagnets (electromagnetic magnets) are used in many fields, one of those uses being electromagnetic brakes. A structural example of a nonmagnetic drive-actuating electromagnetic brake is illustrated in FIG. 8. In the figure, a prior art brake includes a magnet (51) constructed of a core (yoke) (51A) and a coil (51B) disposed within the core, a lining (52)(frictional material), an armature (53)(movable core) that performs a releasing action between (51) and the lining (52), a braking spring (54), an end plate (55) (rotating disc) that is fixed to the rotating axis. When the coil (51B) is not magnetically driven, the armature (53) is strongly pressed against the lining (52) by the force of the braking spring (54), and braking occurs. In this state, a gap g is generated between the adhering surface of the magnet (51) and the armature (53). When the coil (51B) is magnetically driven (e.g., electrically excited), the armature (53) is attracted to the adhering surface of the magnet (51) by the electromagnetic force and braking ceases.

During this type of brake actuation and release, a large impact noise is typically generated. For example, when the magnet (51) adheres to the armature (53), and when the magnet (51) releases the armature (53), an impact noise is generated at the marginal part and the braking spring (54), and the edge part of the inner circumferential surface of the lining (52), respectively. Therefore, rubber or a thin steel plate is attached to the magnet (51) or armature (53) and, by absorbing the impact, reduces the adhering or impact noise.

However, when using impact absorbing material such as rubber, etc., due to the large impact force received, there are problems with the method of attachment and the life span of the material; and not only is maintenance difficult, but also there is the disadvantage that the processing cost is high.

DISCLOSURE OF INVENTION

The foregoing and other objects, features and advantages of the present invention will become more apparent in light of the following detailed description and accompanying drawings.

A principal object of the present invention is an electromagnetic device in which the aforementioned problem is solved in a simplified structure that reduces the generation of impact noise.

It is an additional object of the present invention to provide an electromagnetic device with a simple structure for which impact noise is reduced.

This present invention is characterized in that indentations and projections that are arranged and dimensioned to engage or mesh are formed so that the characteristics of an opposing electromagnet and a plunger transliteration electromagnet are conferred to a magnetic path part at which the magnet faces the armature, and in that the speed of the armature action as well as the holding position are established by controlling the activation of the magnet.

When the open space between the magnet section and the armature is large, because the overlapping interval is small, a large attraction is produced by the plunger characteristic and, as the open space is narrowed, the attraction of the opposing electromagnet increases. As a result, the attraction force characteristic, which expresses the relationship between the attraction and the open space between the magnet and armature, becomes almost flat, and the holding position can be freely established through, e.g., regulating the magnetic drive voltage (electric current). Thus, by means of changing the drive voltage (electric current) either continuously or step wise, it is possible to slow the armature attraction time and release time, thus reducing the noise through a cushioning of the impact force.

DETAILED DESCRIPTION OF PREFERRED EMBODIMENTS AND BEST MODE

This invention will be explained in detail based on an application examples illustrated by the figures below.

Figure 1:
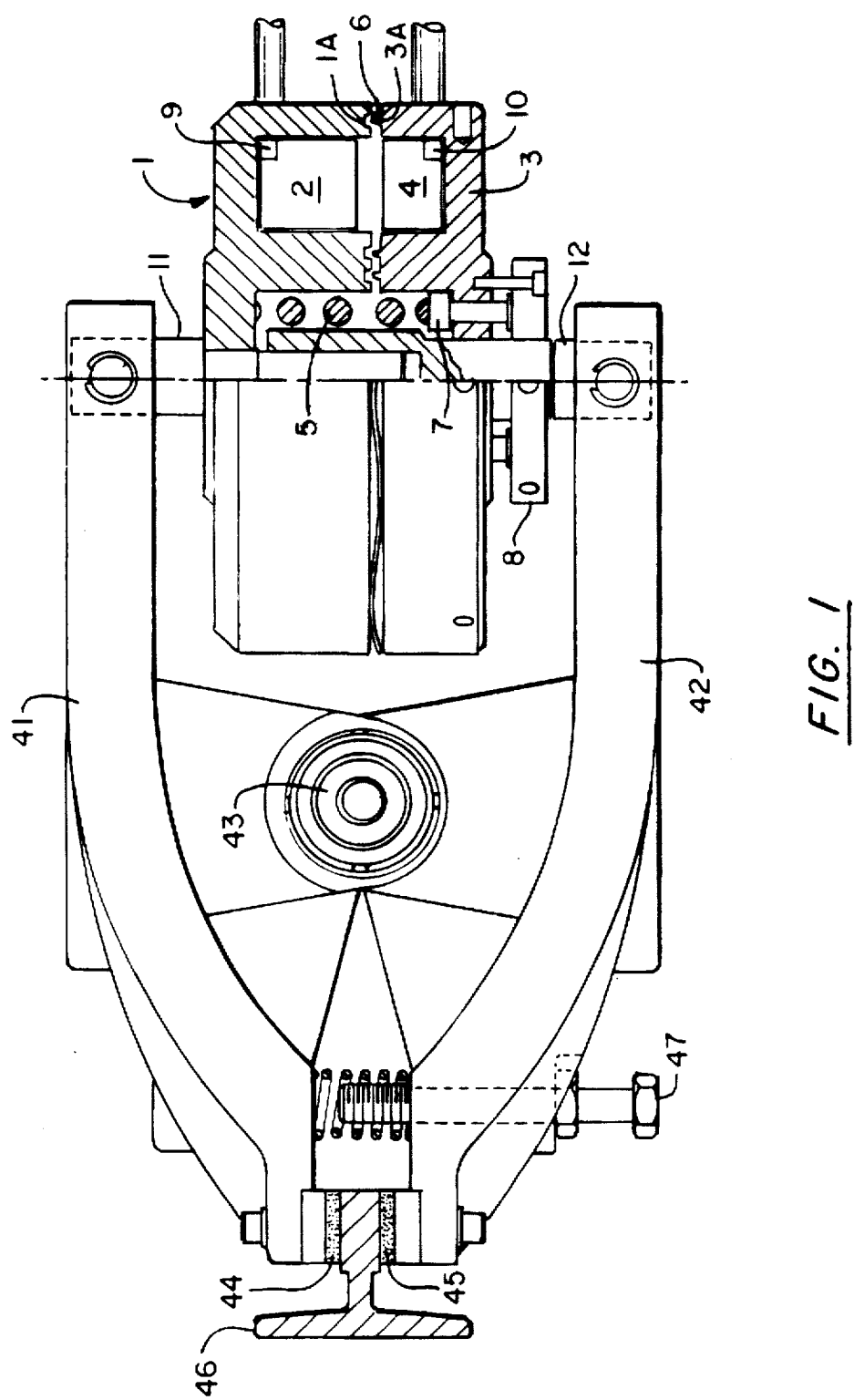
FIG. 1 is a partial top view of a cross section illustrating the application example of the electromagnetic device of this invention.

An application example of an electromagnetic device according to this invention is illustrated in FIG. 1. This application example is for a nonexcitation actuation electromagnetic brake used for elevators. In the FIG. 1, a brake includes a generally cylindrical yoke or stator (1), a normal use coil (2) which is provided at this yoke (1), an armature (3), an emergency use coil (4) provided at a general cylindrical armature (3), a braking spring (5), a noise damping waveform spring or wave washer spring (6), a spring bearing (7), a spring load adjusting ring (8), heat guards (9) and (10), and support rods (11) and (12). The support rod (11) at one side is fixed to the yoke (1) in such a way that it passes through the central part of the yoke (1). The support rod (12) at the other side is inserted into the support rod (11) at the other side in a manner so that it can slide while approximately half of it forms a cylindrical shape, and it forms a screw part at the outer circumferential surface approximately half way towards the center of the remaining part, and is screwed into a screw hole of the spring load adjusting ring (8). The spring load adjusting ring (8), fixed to the armature (3), performs a load adjustment by means of lock bolt (13).

Figure 2:
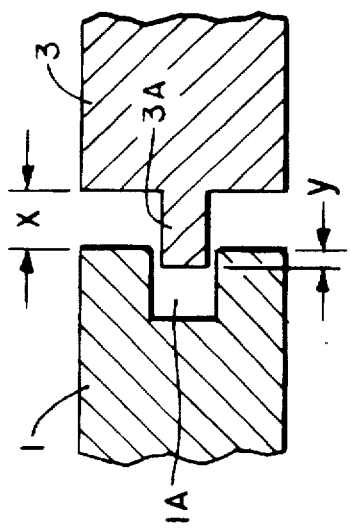
FIG. 2 is an enlarged cross-sectional view illustrating an important part in the application example of the electromagnetic device of this invention.

The yoke (1) and the armature (3) form an indentations (or annular grooves) and projections (or annular ridges)(for example, the indentation (1A) on the yoke (1), the projection part (3A) on the armature (3)) at their facing magnetic path area so that they can engage (or mesh with) each other. This indentation/projection process or arrangement provides the electromagnet with characteristics of both an opposing electromagnet and a plunger electromagnet, and the depth, height, number, position, etc., are established so that the required distance vs. attraction characteristic can be attained. The positional relationship of the yoke (1) and the armature (3) is the relationship such as is illustrated in FIG. 2 for one group of indentations and projections. A space x of the open face of the indentation (1A) and the edge face of the projection (3A) is equivalent to the opposing face interval of the opposing electromagnet, and a space y of the open face of the indentation (1A) and the edge face of the projection (3A) is equivalent to the overlapping interval of the plunger electromagnet. In other words, the indentation/projection non-processing part and the indentation/projection processing part are equivalent to the opposing type and the plunger type, respectively.

Figure 4:
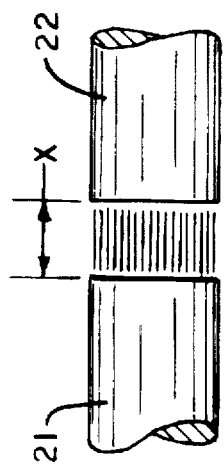
FIG. 4 is a structural schematic illustrating the attraction function of the opposing type electromagnet.
Figure 5:
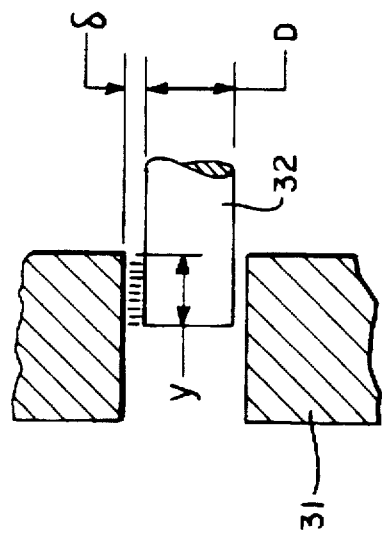
FIG. 5 is a structural schematic illustrating the drawing-in function of the plunger electromagnet.

Here, calculation of the attracting force $F_1$ of the opposing electromagnet (refer to FIG. 4) and the drawing-in force $F_2$ of the plunger electromagnet (refer to FIG. 5), is as follows, with S: cross sectional area of the magnetic path (m$^2$), P: the cavity permeance, x: opposing interval (m) of the yoke (core)(21) of the opposing electromagnet and the armature (movable core)(22), y: overlapping interval (m) of the core (31) of the plunger type electromagnet and the plunger (32), U: magnetic drive ampere-turn (AT), μ: magnetic permeability of the air (Wb/AT·m), D: diameter (m) of plunger (32), δ: gap (m) between the outer circumferential surface of the plunger (32) and the inner circumferential surface of the core (31). For the opposing electromagnet, it becomes $$P = \frac{\mu S}{X}$$ Number 1

$$\frac{dP}{dX} = \frac{-\mu S}{X^2}$$

$$F_1 = -U^2 \frac{\mu S}{2X^2}$$

The values are negative, and the force acts in the direction to which the opposing interval x decreases. For the plunger electromagnet, it becomes $$P = \frac{\pi\mu(D + 2\delta)y}{\delta}$$ Number 2

$$\frac{dP}{dy} = \frac{\pi\mu(D + 2\delta)}{\delta}$$

$$F_2 = U_2 \frac{\pi\mu(D + 2\delta)}{2\delta}$$

The values are positive, and the force acts in the direction to which the overlapping interval y increases.

Figure 3:
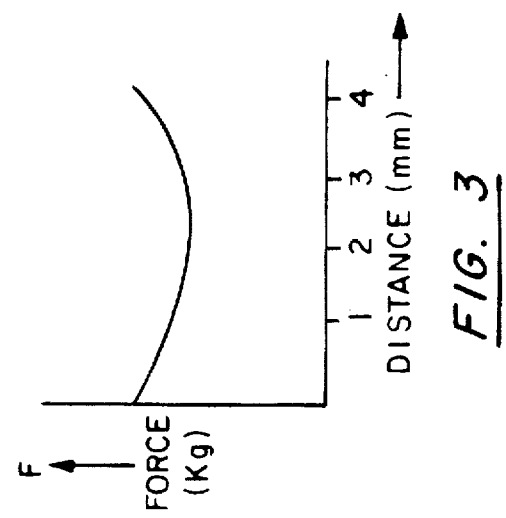
FIG. 3 is a graph illustrating the distance vs. attraction relationship of the application example of the electromagnetic device of this invention.
Figure 6:
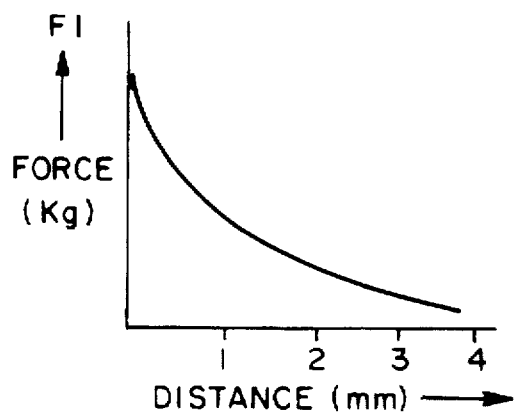
FIG. 6 is a graph illustrating the relationship of the opposing distance vs. attraction force of the opposing type electromagnet.
Figure 7:
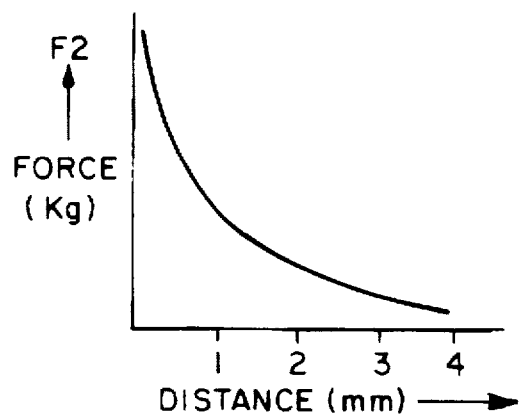
FIG. 7 is a graph illustrating the relationship of the overlapping interval and drawing-in force of the plunger electromagnet.
Figure 8:
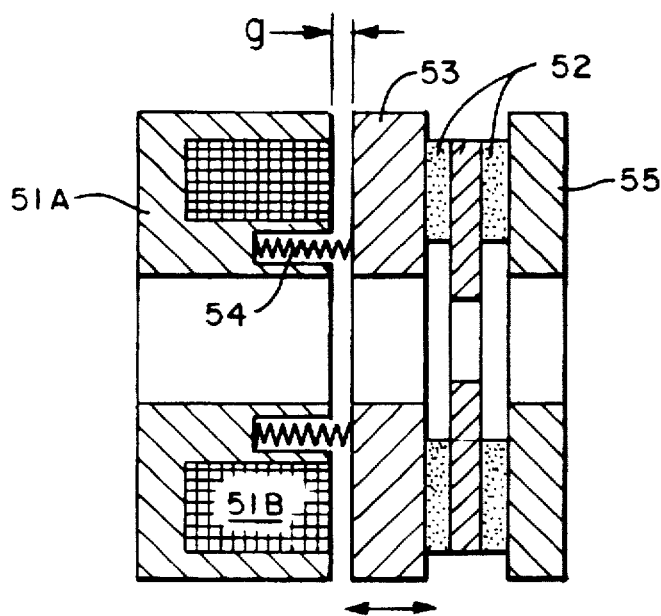
FIG. 8 is a cross-sectional view illustrating a structural example of an existing (prior art) electromagnetic device.

Both of the attracting force characteristics are as shown in FIGS. 6 and 7. As in FIG. 2, when an indentation and a projection are formed on the yoke (1) and armature (3), and when the opposing interval x is small (and overlapping interval y is large), the characteristics of the plunger type; and when the opposing interval x is large (and overlapping interval y is small), the characteristics of the plunger type, respectively, occupy a large specific gravity, and when the overlapping interval y is made small at the initial setting, that attractive force (interval x—attractive force F) becomes almost flat, as illustrated in FIG. 3.

In this type of attractive force, there is no steep change in force, and the activation speed of the armature (3) and retention position can be freely set by adjusting the magnetic drive voltage (electric current). Accordingly, when the voltage (electric current) is increased continuously or step wise and the attraction time and the release time of the armature (3) are slowed, the impact force is cushioned and generation of noise is controlled. In other words, impact noise is markedly reduced.

In the case of the electromagnetic device of the above-mentioned structure being used in a non-magnetic drive actuation magnetic brake used for elevators, as illustrated in FIG. 1, arms (41) and (42) are connected by pins to the ends of the support rods (11), (12), and the attachment parts in the middle of the arms (41) and (42) are attached to a support axis (43) to rotate freely. Linings (44) and (45) are fixed to the ends of the arms (41) and (42), and a rail (46) is firmly held in place between, and separated by both of the linings (44) and (45). A manual releasing bolt (47) is attached at the ends of the arms (41) and (42)(near the linings (44) and (45)).

In this type of electromagnetic brake, by applying the voltage (electric current), setting of the activation speed and retention position of the armature (3) is optional, and control of sudden stops and buffered stops becomes easy. The magnetic drive voltage is normally applied to the normal use coil (2).

Furthermore, the indentation and projection of the above-mentioned application example are not limited to the plunger-shaped, engaging type, but include those that achieve the same results, such as a meshing form, in which a groove and a projection are opposite. Also, even in the case of disc brakes in which the armature directly presses against the lining, the impact noise can be reduced similarly through a cushioning of the impact force.

By means of this invention as described above, because the indentation and the projection are formed to confer the opposing type and plunger type characteristics at the magnetic path where the yoke of the magnet faces the armature, the activation speed and the retention position of the armature can be set at will by a magnetic drive control, and it is possible to cushion the impact force by controlling and reducing the speed of the armature, in other words, a reduction of the impact noise is attainable. Moreover, this can be accomplished simply with the structure of an indentation and a projection on the magnetic part where the yoke faces the armature.

A further aspect of the present invention is shown with reference to FIGS. 9–14.

A structural example of a known nonmagnetic drive actuating type electromagnetic brake is illustrated in FIGS. 11–14. In the FIG. 11, (51) is a magnet with a structure in which a coil (51B) is equipped or disposed within a core (yoke)(51A), (52) is a lining (frictional material), (53) is an armature (movable core) that performs a braking action between it and the lining (52), (54) is a braking spring, (55) is an end plate (rotating disk), (56) is a noise-damping shim, and the braking state is created when the coil (51B) is not magnetically driven and the armature (53) strongly presses against the lining (52) by the force of the braking spring (54). When the coil (51B) is magnetically driven, the armature (53) is attracted to the adhering surface of the magnet (51) by electromagnetic force, and the braking action ceases, through which, axes of rotation of the end plate (55) and the lining (52), comprising a motor, for example, are allowed to rotate.

During this type of brake actuation and cancellation, great impact noise is generated. For example, when the magnet (51) pulls in the armature (53) and when the magnet (51) releases the armature (53), impact noise is generated at the respective marginal part and the braking spring (54), and the edge part at the inner circumferential surface of the lining (52). Therefore, a noise-damping shim (56), in which several thin annular steel plates are laminated and pawls (56A) are formed at their outer circumference at several sections (for example, at four equally spaced sections), is attached to the outer marginal part of the armature (53) in order to reduce the impact noise.

However, the noise-damping shim (56) with a structure in which several thin plates are laminated in said manner has the following problems.

1. It is annular, therefore, the material yield is poor, and the cost is further increased because it is laminated in several layers.

2. It is secured to the armature (53) by the pawls (56A) at several sections; however, a rigid fixing is difficult.

3. There are large differences in the noise-damping effect according to the fixing method used (the noise-damping effect is small when it is rigidly secured by a rivet, for example, and the noise-damping improves if it is secured in such a manner that each sheet has as much freedom to move as possible).

4. Because it is thin steel plates, it has a short service life for repeated operation, which not only creates problems in maintenance but also negatively affects the braking operation when the steel plates become broken.

5. In consideration of each of the items above, the silencing effect is poor when the noise-damping shim is constructed in a single thick plate.

Therefore, a further object of the present invention is to offer an electromagnetic brake in which the aforementioned problem is solved and the impact noise can be reduced with a simplified structure.

The present invention for an electromagnetic brake, in which the braking action occurs between the armature and the friction surface of the object being stopped or between the friction surface provided for an arm, that follows the armature and the object being stopped following the attracting and releasing operations between a magnet with a structure in which a coil is provided on a yoke, and an armature, is further characterized by including an annular noise-damping waveform spring of nonmagnetic material in the form of a sheet being attached to the outer marginal area of a surface at which the magnet faces the armature.

The armature makes contact with the magnet (or the frictional surface) with a large impact force during attracting movements of the magnet. The impact force during this time is absorbed by the damping action of the noise-damping waveform spring, therefore; the impact noise is significantly reduced.

A further application example of an electromagnetic brake according to the present invention is again illustrated in FIG. 1. This application example is for a nonexcitation actuation type electromagnetic brake used, e.g., for elevators. In the figure, (1) is a yoke, (2) is a normal-use coil which is provided at this yoke (1), (3) is an armature, (4) is an emergency use coil provided at this armature (3), (5) is a braking spring, (6) is a noise-damping waveform spring, (7) is a spring seat, (8) is a spring load adjusting ring, (9) and (10) are heat guards, and (11) and (12) are support rods. The support rod (11) at one side is fixed to the yoke (1) in a condition in which it passes through the central part of the yoke (1). The support rod (12) at the other side is inserted into the support rod (11) at the other side in a manner so that it can slide while approximately half of it forms a cylindrical shape, and it forms into a screw part at the outer circumferential surface approximately halfway towards the center of the remaining part, and is screwed into a screw hole of the spring load adjusting ring (8). The spring load adjusting ring (8) is fixed to the armature (3), while a load adjustment is performed with a lock bolt (13).

The yoke (1) and the armature (3) form an indentation and a projection (for example, an indentation part (1A) on the yoke (1) and a projection part (3A) on the armature (3)) at their facing magnetic path area in a manner so that they can engage each other. This indentation and projection process or arrangement is for equipping the electromagnet with characteristics for both the opposing type electromagnet and the plunger type electromagnet, and the depth, height, number, position, etc., are established so that a required distance-attracting force characteristic (flat characteristic) can be attained.

Figure 10:
FIG. 10 is a side view which illustrates the noise-damping waveform spring in the electromagnetic brake of the application example of a further aspect of the present invention.
Figure 9:
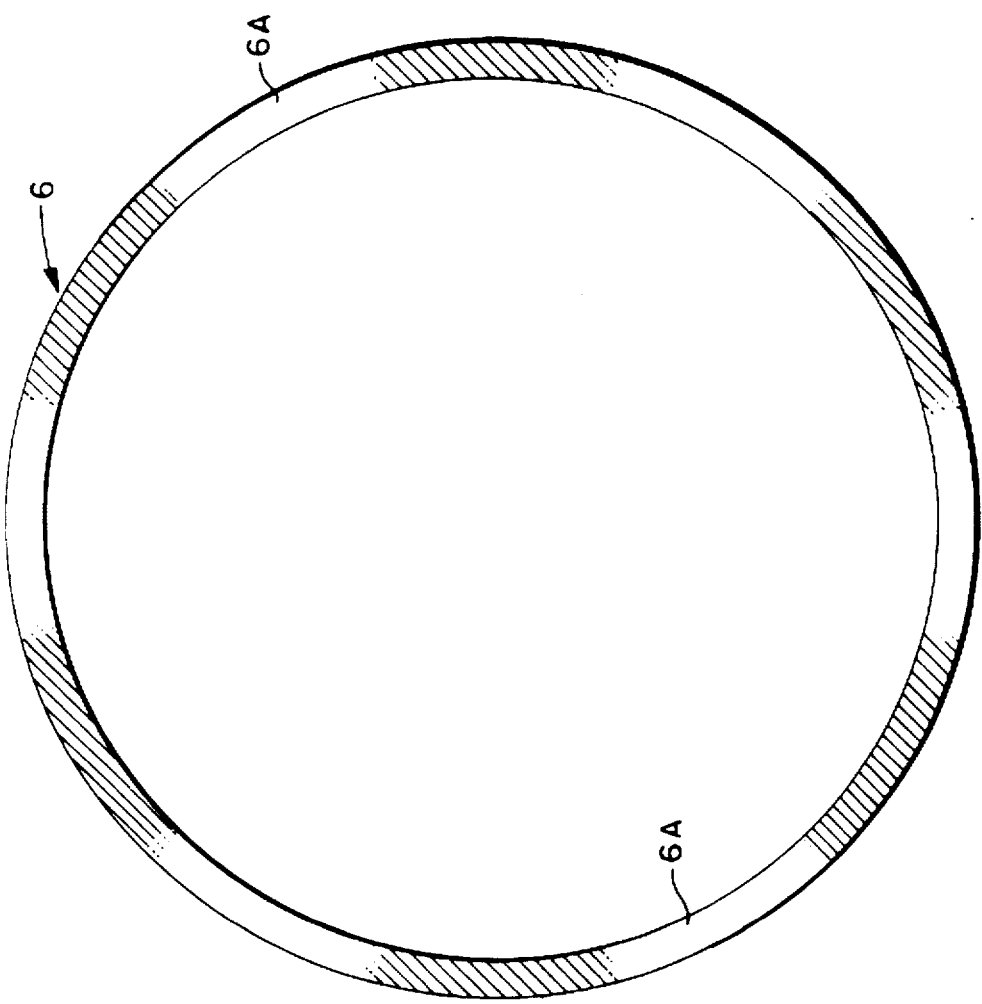
FIG. 9 is a front view which illustrates a noise-damping waveform spring of the electromagnetic brake in an application example of a further aspect of the present invention.
Figure 12:
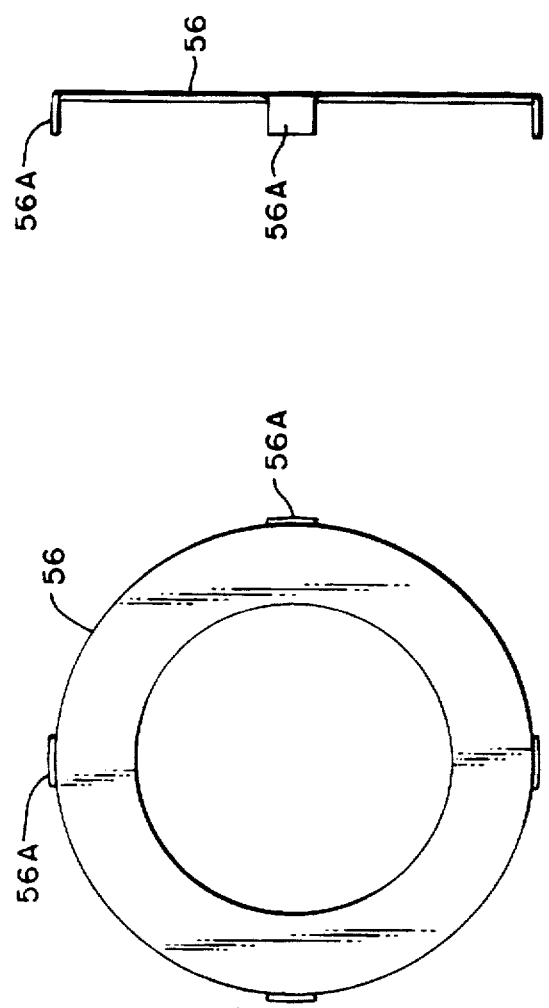
FIG. 12 is a front view which illustrates an example of a noise-damping shim of the conventional technology.
Figure 13:
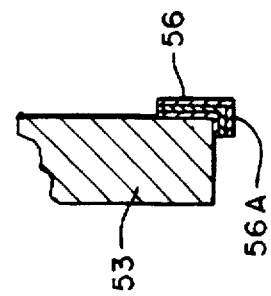
FIG. 13 is a side view which illustrates an example of the noise-damping shim of the conventional technology.
Figure 14:
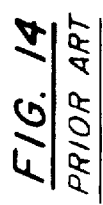
FIG. 14 is a cross section which illustrates an example of an enlarged portion of the noise-damping shim of the conventional technology.
Figure 11:
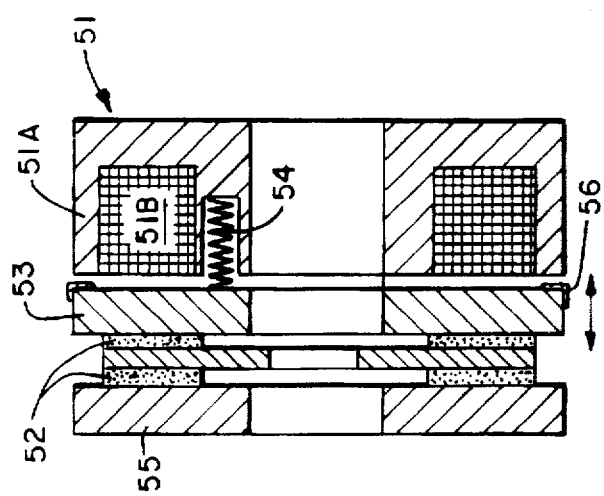
FIG. 11 is a cross section which illustrates a nonexcitation drive actuation type electromagnetic brake in a conventional example.

As illustrated in FIG. 9 and FIG. 10, the noise-damping spring (6) has an undulating form in which projection parts (or indentation parts)(6A) are formed at several sections, for example at six sections with equal spacing, of a thin ring made of a spring material. Its outer diameter is made so that it is almost equal to the outer diameter of the yoke (1) and the armature (3). In FIG. 9, diagonal lines indicate the parts that are lower and held by the projection parts (6A) on both sides. In other words, indentation parts are formed at six sections at equal spacing. The noise-damping spring (6) is attached by providing several projection parts to either the yoke (1) or the armature (3) in a manner so that the inner circumferential surface makes contact with them. In this application example or embodiment, the noise-damping spring (6) is attached by utilizing a portion of the projection part (3A) of the indentation and projection that are formed in order to improve the attraction force characteristic.

The aforementioned support rods (11) and (12) are connected to arms (41) and (42) by pins at their ends. The attachment parts in the middle of the arms (41) and (42) are attached to a support axis (43) in a manner so that they can freely rotate, and linings (44) and (45) are fixed at the inner sides of the front end part so that a rail (46) is held between them for braking. A manual operation releasing bolt (47) is provided at the front end parts (near the linings (44) and (45)) of the arms (41) and (42).

Next, the operation will be described. The normal-use coil (2) is generally used. During the time the normal coil (2) is not magnetically driven, the yoke (1)(magnet including the coil (2)) and the armature (3) are in an open and separated state by the force of the braking spring (5), which is at the position where the support rods (11) and (12) are maximally open. In this state, the rotational force respectively applies to the arm (41) in the counterclockwise direction and the arm (42) in the clockwise direction at the support axis (43) as a supporting point, and the linings (44) and (45) strongly press against the rail (46); in other words, it is in a braking state. When drive current flows into the normal-use coil (2), the armature (3) is attracted against the force of the braking spring (5). Both the magnet and the armature (3) move and adhere during this attraction operation. At this time, the arm (41) and the arm (42) respectively rotate in a clockwise direction and a counterclockwise direction at the support axis (43) as a supporting point, and the linings (44) and (45) separate from the rail (46), in other words, the braking is action is terminated.

The armature (3) makes contact with the yoke (1) of the magnet with a large impact force during an attracting operation of the armature (3) by the magnet. The impact force during this time is absorbed by the damping action of the noise-damping waveform spring (6), which is attached to the outer marginal area of the armature (3) facing the yoke (1), and as a result, the impact noise is significantly reduced. The noise-damping waveform spring (6) is made of one sheet and its attachment is stable, and the noise-damping effect can be maintained for a long period of time against repeated operations because of its sufficient durability.

By forming the noise-damping waveform spring (6) from a nonmagnetic material such as a suitable plastic, composite, synthetic rubber or even a suitable commercially available non-magnetic metal, in addition to the noise-damping effect, there is also the effect of reducing the response time by the residual magnetic force when the magnet core (yoke) is released from the armature. The aforementioned application example concerns a type of a nonmagnetic drive actuating type electromagnetic brake, in which the linings engage with the object being stopped through the arms, which follow the attracting and releasing operations of the magnet and the armature; however, it can also be similarly implemented in a nonexcitation drive actuation type electromagnetic brake in a structure in which the armature is directly pressed against the linings (structure in the existing example illustrated in FIG. 11) and in a magnetic drive actuating type electromagnetic brake.

As described above, in the additional aspect of the present invention, an annular noise-damping waveform spring (or wave washer spring) is attached to either the armature or the yoke of the magnet; therefore, the impact force during attraction can be absorbed by the damping action of the waveform spring, and the impact noise can be significantly reduced. Moreover, it uses an attachment structure in which it is in single sheet form and makes contact with the projection part at the inner circumferential surface; therefore, a stable attachment state can be obtained, and a high noise-damping effect can be expected for a long period of time. Moreover, the response time during the release of the armature can be effectively improved when the waveform spring is formed from a nonmagnetic material.

While it has been shown and described what is presently considered preferred embodiments of the present invention, it will be readily understood to those skilled in the art that various changes and modifications may be made therein without departing from the spirit and scope of the present invention which shall be defined only by claims.

What is claimed is:

1. An electromagnetic actuator for a safety brake, comprising:

a generally cylindrical stator with first and second flat annular surfaces surrounding an annular bore;

a generally cylindrical armature having third and fourth flat annular surfaces disposed for axial motion toward and away from said first and second surfaces, respectively, said first and third surfaces being substantially coextensive and forming a first pair of opposing surfaces, said second and fourth surfaces being substantially coextensive and forming a second pair of opposing surfaces;

spring means for urging said armature away from said stator; and an annular electrical coil in said bore for attracting said armature toward said stator when energized;

characterized by the improvement comprising:

one of said first pair of opposing surfaces having a first annular groove and the other of said first pair of opposing surfaces having a first annular ridge opposing said first annular groove;

one of said second pair of opposing surfaces having a second annular groove and the other of said second pair of opposing surfaces having a second annular ridge opposing said second annular groove; and each ridge being outside of the related groove when said coil is disenergized and extending into the corresponding groove when said coil is energized, thereby shorting out an amount of magnetic flux in proportion to the distance between said opposing surfaces.

2. An actuator according to claim 1, further comprising:

an annular, noise damping waveform spring disposed on a radially outward one of said annular surfaces, thereby to absorb some of the force of impact of the surfaces of said rotor against the surfaces of said stator, whereby to reduce the noise of impact.

* * * * *